United States Patent Office 3,032,554
Patented May 1, 1962

3,032,554
PROCESS FOR THE PREPARATION OF NEW THEOPHYLLINE DERIVATIVES
Ernst Jucker, Binningen, Basel-Land, Erwin Rissi, Basel, and Rudolf Süess, Rheinfelden, Switzerland, assignors to Sandoz Ltd., Basel, Switzerland
No Drawing. Filed Nov. 16, 1959, Ser. No. 852,968
Claims priority, application Switzerland Nov. 21, 1958
7 Claims. (Cl. 260—256)

The present invention relates to novel theophylline compounds and a process for their manufacture.

It is an object of the invention to provide novel theophylline derivatives which possess unexpectedly useful pharmacological properties.

It is a further object of the invention to provide a process for the production of these new theophylline derivatives.

Theophylline preparations and theophylline derivatives are widely used for beneficial diuretic, cardiac and muscular action and are generally preferred over such xanthines as caffeine in the treatment of cardiac edema by reason of avoidance of side effects such as insomnia, nervousness, etc. However, due to the slight solubility of theophylline and its known derivatives, the usefulness of this xanthine base, per se, has been quite limited. It has been necessary to use theophylline almost exclusively in the form of soluble double salts, e.g., theophylline and sodium acetate, theophylline and ethylene diamine (aminophylline), etc. (See "New and Non-official Remedies, Council of Pharmacy and Chemistry, A.M.A." (1952) J. P. Lippincott Company, page 294.)

The use of the particular salt selected to achieve solubility represents a disadvantage in administering the drug since the salt has a diluting effect so as to require a larger total dosage to achieve the effectiveness of the pharmacologically active theophylline ingredient which would be derived without such diluent salt.

Increased solubility as in the case of aminophylline, i.e. the ethylene diamine theophylline double compound has led to the achievement of useful peripheral vasodilator action and myocardial stimulation for relief of pulmonary edema or paroxysmal dyspnea of congestive heart failure with this drug. Increased solubility may also be a factor in the recognized usefulness of aminophylline for treatment of paroxysms of bronchial asthma or status asthmaticus, this known theophylline compound being administered by intravenous or intramuscular injection or by inhalation as an aerosol to control immediately dyspnea of cardiac or asthmatic origin.

Despite the important role that theophylline plays in the management of the cardiac patient and the asthmatic patient, the Council on Pharmacy and Chemistry does not accept claims for the efficacy of xanthine therapy, particularly aminophylline in the treatment of coronary thrombosis and angina pectoris. Nevertheless aminophylline is the preparation of choice for administration either orally or by injection in cardiac conditions and orally, rectally, by injection or by inhalation for asthma.

The compounds of the present invention provide novel theophylline derivatives of enhanced water solubility which possess unexpectedly useful pharmacological properties, in particular, a marked histamine, serotonine and acetyl choline inhibiting effect. These pharmacological effects and physical properties are achieved by a new chemical mechanism, entirely different from that of enhanced solubility by ethylene diamine double salt formation as in the case of aminophylline, thus rendering the compounds of the invention useful under circumstances where larger effective dosage based on theophylline content is required and where the histamine and acetyl choline inhibiting effect is needed in therapy.

At room temperature most of the theophylline derivatives, their salts and quaternary compounds of the invention are solid, crystalline substances; they exhibit good water solubility, have a speeding-up action on the heart beat and dilating effect upon the blood vessels. For example in vitro the hydrochloride of β-pipecolyl-theophylline exerts an antihistamine action about 6 times stronger than that of theophylline, whereas its acetylcholine inhibiting effect is approximately 50 times as strong.

Furthermore, in conjunction with the advantageous and characteristic new histamine and acetylcholine inhibiting effect of the specific substances and their derivatives under Formula I below, the toxicity found with mice as test animals of said substances under Formula I and their derivatives is close to that of theophylline. In view of these new and beneficial therapeutic properties of the compounds under Formula I and their salts and quaternary compounds, these compounds are generally useful as medicinal substances; they or their salts or quaternary compounds may be used, in view of their water solubility, as, for example, in ampoule solutions.

As in the case of aminophylline, administration may be by inhalation, orally, rectally, intravenously, subcutaneously or intramuscularly.

The invention provides theophylline compounds having the general Formula I,

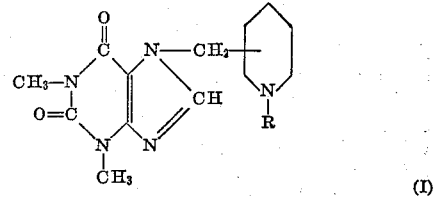

(I)

wherein R is hydrogen or the methyl group, and their salts and quaternary compounds.

The above compounds I may be obtained in that a compound having the general Formula II,

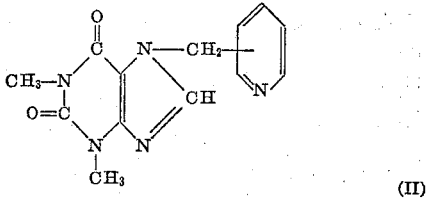

(II)

which may be produced as described in patent application Ser. No. 852,967, filed in U.S. Patent Office on even date herewith to the same inventors, or a quaternary derivative thereof, is catalytically hydrogenated.

When it is desired to produce a corresponding quaternary compound from an unquaternized compound I, the last mentioned material is treated with an alkyl- or hydroxyalkyl-ester of an organic or inorganic acid to give said quaternary compound, or when it is desired to produce the corresponding salt, the said compound I is treated with an organic or inorganic acid in manner known per se (the term "known" as used herein designates a method which is in actual use or described in the literature on the subject) to give the said salt.

Those of the above compounds in which R is methyl, may alternatively be produced by reacting theophylline with an N-methyl-pipecolyl halide.

Another method of producing the above compounds I is the method in which theophylline is reacted with an N-methyl-pipecolyl halide at an elevated temperature and the resulting product is reacted with a methyl halide, for example methyl bromide, thus giving a quaternary compound.

As described in patent application Ser. No. 852,967, filed in U.S. Patent Office on even date herewith to the same inventors, a process for the production of the above compounds II (i.e. starting materials for producing the compounds of the present invention) is characterized in that theophylline is reacted with a compound having the general Formula IIa.

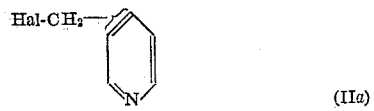

(IIa)

wherein Hal is chlorine or bromine; terminal chlorine substituted alkyl pyridines of the above Formula IIa are readily available. For example, these chlorides may be prepared from the corresponding alkanol pyridines which are prepared in U.S. patent to Cislak, No. 2,789,982. The alkanol pyridines from which the chloride is made in said Patent No. 2,789,982 may have an alkyl side chain of more than 6 carbon atoms but the products of the invention are restricted to use of these pyridines having only 1 carbon atom in the side chain $CH_2=1$. When it is desired to produce the corresponding quaternary compound, the said compound II is treated with a lower alkyl or hydroxyalkyl ester of a pharmaceutically acceptable organic or inorganic acid to produce said quaternary compound, or when it is desired to produce the corresponding salt, the said compound II is treated with an organic or inorganic acid in manner known per se (the term "known" as used herein designates a method which is in actual use or described in the literature on the subject) to give the said salt.

The acid addition salts of the novel theophylline derivatives of Formula I are generally stable crystalline salts and are prepared by reacting the theophylline compound of Formula I with pharmacologically acceptable inorganic or organic acids such as hydrochloric acid, hydrobromic acid, hydroiodic acid, sulfuric acid, phosphoric acid, nitric acid, benzoic acid, benzene sulfonic acid, naphthalene sulfonic acid, naphthalene 1,5-disulfonic acid, salicylic acid, glycolic acid, levulinic acid, stearic acid, myristic acid, palmitic acid, succinic acid, mandelic acid, nicotinic acid, tartaric acid, citric acid, isocitric acid, maleic acid, glutaric acid, malic acid, pimelic acid, lactic acid and the like.

As indicated above, the free theophylline base derivative of the invention is readily converted nto quaternary ammonium salts by reacting the base of Formula I with a lower alkyl or lower alkyl derivative of a pharmacologically acceptable organic acid or of a physiologically acceptable inorganic acid. Examples including pharmacologically acceptable anions are methyl bromide, methyl chloride, methyl iodide, dimethyl sulfate, diethyl sulfate, and lower hydroxy alkyl esters of organic or inorganic acids and the like. The lower hydroxy alkyl esters of pharmacologically acceptable organic and inorganic acids include hydroxy ethyl acetate, ethylene chlorohydrin, propylene chlorohydrin, etc. The word "lower" as applied to hydroxy alkyl esters and alkyl esters of pharmacologically acceptable organic and inorganic acids means that the alkyl or hydroxyalkyl group in question contains not more than four carbon atoms. Since the pharmacological activity of the theophylline quaternary ammonium salt is due to the cation, any anion of the quaternary ammonium base which is pharmacologically acceptable may be used.

The compounds of Formula I may be used especially in the case of cardiac insufficiency, angina pectoris and bronchial asthma.

In the following examples which illustrate the carrying out of the process of the invention but are not limitative in any way, the temperatures are stated in degrees centigrade.

Although the present invention is described herein with particular reference to specific details, it is not intended that such details shall be regarded as limitations upon the scope of the invention except insofar as included in the accompanying claims.

*Example I.—7-β-Pipecolyl-Theophylline Hydrochloride*

6.15 g. of 7-β-picolyl-theophylline hydrochloride are dissolved in 100 cc. of distilled water and in the presence of 0.3 g. of platinum oxide at 6 atmospheres' pressure and 55–60° are hydrogenated. The amount of hydrogen which is calculated to effect hydrogenation, is complete after 1¼ hours. The catalyst is filtered off and the clear aqueous solution is evaporated at a reduced pressure at 60° until dry. The remaining residue is dried for 3 hours in a high vacuum at room temperature and then recrystalized twice from 95% ethanol.

Pure 7-β-pipecolyl-theophylline hydrochloride crystallizes in the form of fine needles and melts at 228–230° with foaming. Sintering point approximately 173°. The free base may be obtained in known manner.

*Example II.—7-(N-Methyl-β-Pipecolyl)-Theophylline Hydrochloride*

6.14 g. of 7-β-picolyl-theophylline iodomethylate are dissolved in 50 cc. of distilled water and hydrogenated in the presence of 0.1 g. of platinum oxide at 6 atmospheres' pressure and 55–60°. The calculated amount of hydrogen is taken up during 1½ hours. The catalyst is filtered off and the clear filtrate is evaporated to dryness at a reduced pressure at 70°. The crystalline residue is then dissolved in 25 cc. of water and the solution is mixed with an excess of 40% sodium hydroxide solution while cooling with ice. The ice cold reaction mixture is then extracted 4 times with chloroform and once with benzene, the united extracts are dried over sodium sulphate and the solvent is distilled off at a reduced pressure at 60°.

In order to produce the hydrochloride from the resulting crude base, the last mentioned material is dissolved in 100 cc. of methanol, a small amount of insoluble material is filtered off and the filtrate is mixed with hydrochloric acid gas while cooling with ice until an acid reaction with Congo indicator results. The acidified methanolic solution is evaporated to dryness at a reduced pressure at 60°, and the residue is recrystallized three times from approximately 95% ethanol.

Pure 7-(N-methyl-β-pipecolyl)-theophylline hydrochloride crystallizes with 1.5 mol of water of crystallization and melts at 227–231° with decomposition.

*Example III.—7-(N-Methyl-β-Pipecolyl)-Theophylline Iodomethylate*

A solution of 4.0 g. of 7-(N-methyl-β-pipecolyl)-theophylline in the form of the crude base (see Example II, first paragraph) in 95 cc. of absolute benzene is mixed while cooling with ice with one batch constituted by 5.86 g. of methyl iodide (= 3 times the calculated amount). Thereupon the reaction mixture is heated for 5 hours to 40° and the material is then left to stand overnight at room temperature. The precipitated crude iodomethylate is filtered and is recrystallized once from methanol and a little water and then once from 95% ethanol.

Pure 7-(N-methyl-β-pipecolyl)-theophylline iodomethylate melts at 277–279° (decomposition).

*Example IV.—7-[N-(β'-Hydroxyethyl)-β-Pipecolyl]-Theophylline Iodomethylate*

26.1 g. of 1-[N-(β'-hydroxyethochloride)-β-pipecolyl]-theophylline (see Example II of patent application Ser.

No. 852,967, filed in U.S. Patent Office on even date herewith to the same inventors) are dissolved in 200 cc. of distilled water and are hydrogenated in the presence of 0.9 g. of platinum oxide at 6 atmospheres and 55–60°. The calculated amount of hydrogen is taken up after 1½ hours. The catalyst is filtered off and the filtrate is concentrated at a reduced pressure at 70° to approximately half the volume. The concentrated solution is then saturated with solid potassium carbonate while cooling with ice and then made strongly alkaline with 50 cc. of 40% sodium hydroxide solution. Extraction is then effected with 6 portions of methylene chloride, the united extracts are dried over sodium sulphate and the solution is evaporated to dryness at a reduced pressure at 45°. 6.42 g. of the crude 7-[N-(β'-hydroxyethyl)-β-pipecolyl]-theophylline obtained as above are dissolved in 100 cc. of absolute benzene and this solution is mixed in one batch with 8.52 g. of methyl iodide. The reaction mixture is then heated to 40° for 21 hours while stirring well and the strongly hygroscopic precipitate is filtered off. By repeated recrystallization of the crude product from methanol/ether there is obtained pure 7-[N-(β'-hydroxyethyl)-β-pipecolyl]-theophylline iodomethylate.

Melting point 226–229° (decomposition). Sintering at 158–160°.

*Example V.—7-γ-Pipecolyl-Theophylline Hydrochloride*

15.0 g. of 7-γ-picolyl-theophylline hydrochloride are dissolved in 150 cc. of distilled water and hydrogenated in the presence of 0.7 g. of platinum oxide at 6 atmospheres and 55–60°. The calculated amount of hydrogen is taken up in two hours. Filtering off of the catalyst is effected and the clear aqueous solution is evaporated at a reduced pressure and 60° until dry. The remaining residue is dried for 3 hours in a high vacuum at room temperature and then recrystallized twice from 95% ethanol. Pure 7-γ-pipecolyl-theophylline hydrochloride crystallizes in the form of colourless needles having a melting point of 279–283° (decomposition).

*Example VI.—7-(N-Methyl-γ-Pipecolyl)-Theophylline Hydrochloride*

34.1 g. of 7-γ-picolyl-theophylline iodomethylate are dissolved in 175 cc. of distilled water and hydrogenated in the presence of 0.7 g. of platinum oxide at 6 atmospheres and 55–60°. The calculated quantity of hydrogen is taken up in 1½ hours. The catalyst is filtered off and the clear filtrate is evaporated to dryness at a reduced pressure and 70°. The crystalline residue is dissolved in 125 cc. of water and the solution is saturated with solid potassium carbonate while cooling with ice and then a 40% sodium hydroxide solution is added until the material is strongly alkaline. The reaction mixture is extracted several times with methylene chloride, the united extracts are dried over sodium sulphate and the solvent is distilled off at a reduced pressure at 45°.

In order to produce the hydrochloride, the crude base is dissolved in methanol, a small amount of insoluble material is filtered off, and the filtrate has added to it hydrogen chloride gas until it shows an acid reaction with Congo indicator. The acid methanolic solution is evaporated to dryness at a reduced pressure at 60°, and the residue is recrystallized three times from absolute ethanol. Pure 7-(N-methyl-γ-pipecolyl)-theophylline hydrochloride is hygroscopic and melts at 282–284° (decomposition, red colouring).

*Example VII.—7-[N-(β'-Hydroxyethyl)-γ-Pipecolyl]-Theophylline Iodomethylate*

26.5 g. of 1-[N-(β'-hydroxyethochloride)-γ-picolyl]-theophylline (see Example V of patent application Serial Number 852,967, filed in the U.S. Patent Office on even date herewith to the same inventors) are dissolved in 150 cc. of distilled water and hydrogenated in the presence of 0.6 g. of platinum oxide at 6 atmospheres and 55–60°. The calculated amount of hydrogen is taken up in 1½ hours. The catalyst is filtered off and the filtrate is concentrated at a reduced pressure at 70° to approximately half the volume. The concentrated solution is then saturated with solid potassium carbonate while cooling with ice and then made strongly alkaline by adding 40% sodium hydroxide solution. Extraction with methylene chloride is effected several times, the united extracts are dried over sodium sulphate and the solvent is distilled off at a reduced pressure and 45°. 3.4 g. of the above crude 7-[N-(β'-hydroxyethyl)-γ-pipecolyl]-theophylline are dissolved in 100 cc. of methylene chloride and mixed in one batch with 4.51 g. of methyl iodide. Thereupon the reaction mixture is heated in an oil bath to 40° while stirring well for 17 hours and the strongly hygroscopic precipitate is then filtered off. By repeated crystallization of the crude product from methanol there is obtained pure 7-[N-(β'-hydroxyethyl)-γ-pipecolyl]-theophylline iodomethylate. Melting point 227–230° (with foaming).

*Example VIII.—7-α-Pipecolyl-Theophylline Hydrochloride*

10 g. of 7-α-picolyl-theophylline are suspended in 50 cc. of water and the calculated amount of 1 N hydrochloric acid is added. Hydrogenation is thereafter effected in the presence of 0.05 g. of platinum oxide at 80° and 4–6 atmospheres. After 1 hour 2.78 litres of hydrogen have been taken up and the hydrogenation ceases. The catalyst is filtered off and the solution is evaporated to dryness at 50°. The remaining residue is recrystallized from 70% ethanol and ether. Pure 7-α-pipecolyl-theophylline hydrochloride melts at 310°. The free base is obtained in known manner.

*Example IX.—7-(N-Methyl-2-Pipecolyl)-Theophylline Bromomethylate*

3.6 g. of theophylline (containing 1 mol of water of crystallization) and 4.0 g. of N-methyl-2-pipecolyl-chloride hydrochloride are heated for 15 hours at 185°, whereby the mixture melts with strong evolution of hydrochloric acid gas.

After cooling to room temperature, the content of the flask is taken up in water and extracted once with chloroform. The aqueous layer is made strongly alkaline with concentrated NaOH and extracted with chloroform. The residue of the resulting extract is taken up in methanol and is heated with an excess of methyl bromide for 18 hours in a bomb tube to 50°. The product is crystallized from the cooled reaction mixture. By repeated recrystallization of the crude product from methanol/ether there is obtained pure 7-(N-methyl-2-pipecolyl)-theophylline bromomethylate in the form of colourless highly hygroscopic prisms of a melting point of 282°.

Having thus disclosed the invention, what is claimed is:

1. A compound selected from the group consisting of a base of Formula I

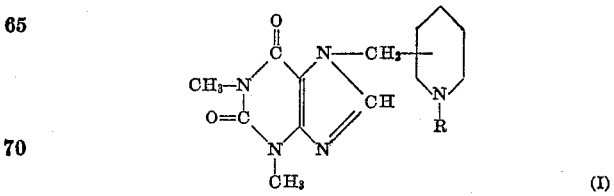

(I)

where R is a member of the class consisting of hydrogen and methyl, the pharmacologically acceptable acid addition salts of said base and the pharmacologically acceptable salts of said base of the Formula II

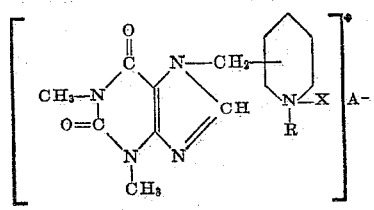

(II)

wherein X is selected from the group consisting of lower alkyl and lower hydroxy alkyl and A is an anion selected from the group consisting of halide and sulfate.

2. 7-β-pipecolyl-theophylline.
3. 7-(N-methyl-β-pipecolyl)-theophylline.
4. 7-[N-(β'-hydroxyethyl)-β-pipecolyl]-theophylline.
5. 7-γ-pipecolyl-theophylline.
6. 7-[N-(β'-hydroxyethyl)-γ-pipecolyl]-theophylline.
7. 7-α-pipecolyl-theophylline.

No references cited.